(12) United States Patent
Terashima (10) Patent No.: US 6,456,767 B2
(45) Date of Patent: Sep. 24, 2002

(54) OPTICAL WAVEGUIDE TRANSMITTER-RECEIVER MODULE

(75) Inventor: Tokihiro Terashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/818,894

(22) Filed: Mar. 28, 2001

(30) Foreign Application Priority Data

Mar. 28, 2000 (JP) ........................................ 2000-089074

(51) Int. Cl.[7] ................................................ G02B 6/30
(52) U.S. Cl. ............................ 385/49; 385/14; 385/83
(58) Field of Search ................................ 385/14, 49, 83

(56) References Cited

U.S. PATENT DOCUMENTS

| | | | | |
|---|---|---|---|---|
| 5,611,008 A | * | 3/1997 | Yap ............................ | 333/247 |
| 5,703,973 A | * | 12/1997 | Mettler et al. ................ | 385/14 |
| 6,222,967 B1 | * | 4/2001 | Amano et al. ................ | 385/49 |
| 6,316,281 B1 | * | 11/2001 | Lee et al. .................... | 385/14 |

* cited by examiner

*Primary Examiner*—Hung N. Ngo
(74) *Attorney, Agent, or Firm*—Wenderoth, Lind & Ponack, L.L.P.

(57) ABSTRACT

A planar-mounted optical waveguide transmitter-receiver module, in which a plurality of separated silicon substrates and a PLC substrate are hybrid-integrated, is provided. In this module, electrical crosstalk between the light emitting element side and photo-receiving element side is reduced, and adhesion area between substrates is decreased. In this module, a first silicon substrate, on which are mounted a light emitting element and photo-receiving element, is positioned opposing a second silicon substrate, in which is formed a V groove, in which an optical fiber is to be inserted and fixed in place with resin or by other means. On joining surfaces of the first silicon substrate and joining surfaces of the second silicon substrate are positioned and fixed in place joining surfaces on the back face of an optical waveguide (PLC) substrate, in which is formed an optical waveguide. By this means, the light emitting element, the photo-receiving element, and the optical fiber inserted into the V groove are optically aligned with and simultaneously optically coupled with the optical waveguide of the PLC substrate.

13 Claims, 7 Drawing Sheets

OPTICAL WAVEGUIDE TRANSMITTER-RECEIVER MODULE

BACKGROUND OF THE INVENTION

1. Field of the Invention

This invention concerns a planar-mounted optical waveguide transmitter-receiver module, in which silicon or other substrates, separated into a plurality of substrates, and an optical waveguide (planar lightwave circuit) substrate (hereafter "PLC substrate"), are hybrid-integrated.

2. Description of Related Art

Optical terminal devices for use in optical subscriber systems are subjected to such demands as smaller integration sizes, multi-functionality, and reduced prices. Optical modules which optical waveguides as devices effective for satisfying such demands are coming into widespread use. Conventional silicon platform structures, in which optical waveguides and silicon substrates are united, have problems which include complexity of manufacturing processes, and limitations on the manufactured quantity per unit wafer. For this reason, various planar-mounted optical waveguide transmitter-receiver modules in which silicon substrate and PLC substrate are hybrid-integrated have been proposed. Below, the structure of conventional optical waveguide transmitter-receiver modules is explained, referring to FIGS. 1 through 3.

Figure 1:
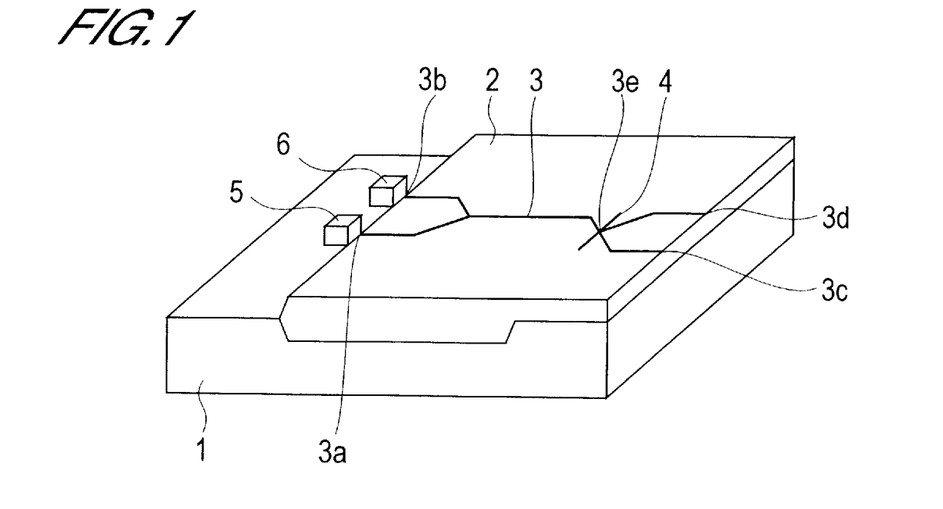
FIG. 1 is a perspective view of a conventional optical waveguide transmitter-receiver module for use in STM-PON systems.

FIG. 1 is a perspective view of an optical waveguide transmitter-receiver module, representing conventional synchronous-transfer mode passive optical networks (hereafter "STM-PON") and π-PON systems.

This optical waveguide transmitter-receiver module has a silicon substrate 1, and an optical waveguide layer 2 is formed on this silicon substrate 1. The optical waveguide layer 2 is formed by, for example, deposition of quartz glass by sputtering methods, and execution of vitrification processing of this deposited layer by means of high-temperature annealing. In this way, the optical waveguide layer 2 and silicon substrate 1 are formed as a unit to constitute the silicon platform substrate. A dual-branching optical waveguide 3 is formed within the optical waveguide layer 2, for use in bidirectional communication. The optical waveguide 3 has entry and exit end faces 3a to 3d, and a groove is cut in the branch part 3e, and a wavelength-selection filter embedded therein. The device with this filter 4 removed is π-PON device.

On the silicon substrate 1, a semiconductor laser or other light emitting element 5 and photodiode or other photo-receiving element 6 are fixed in place, by soldering or other means, to oppose the end faces 3a, 3b of the optical waveguide. The module is designed to enable the connection of optical fibers to the end faces 3c, 3d of the optical waveguide 3 by means of optical connectors.

For example, in an optical waveguide transmitter-receiver module for use in STM-PON systems, a light emitting element 5 and photo-receiving element 6 operate at different times (with different timing). When the light emitting element 5 operates, light is emitted from this light emitting element 5, and this light is incident on the end face 3a of the optical waveguide 3. Light incident on the end face 3a is transmitted within the optical waveguide 3, is wavelength-selected by the filter 4 provided at the branch part 3e, and is, for example, emitted from the end face 3c and sent to an optical fiber via an optical connector. On the other hand, light sent from an optical fiber is incident on, for example, the end face 3c via an optical connector. The incident light is wavelength-selected by the filter 4, and emitted from the end face 3b. The emitted light is received by the photo-receiving element 6, converted into an electrical signal, and output. Light of different wavelengths sent from an optical fiber, after incidence on the end face 3c, is wavelength-selected by the filter 4 and emitted from the end face 3d.

Figure 2:
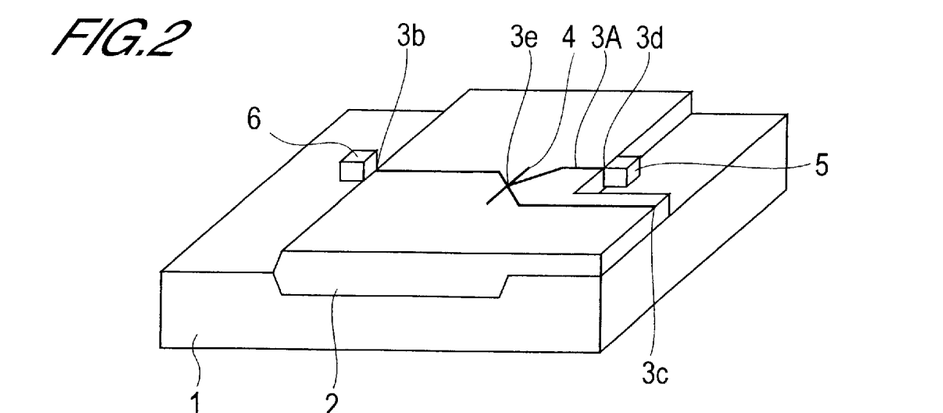
FIG. 2 is a perspective view of a conventional optical waveguide transmitter-receiver module for use in ATM-PON systems.

FIG. 2 is a perspective view of an optical waveguide transmitter-receiver module compatible with a conventional asynchronous-transfer mode passive optical network (asynchronous transfer mode PON, hereafter "ATM-PON" systems).

This optical waveguide transmitter-receiver module for ATM-PON systems has nearly the same optical component configuration as in FIG. 1, but the shape of the optical waveguide 3A formed within the optical waveguide layer 2, and the fixed positions of the emissive element 5 and photo-receiving element 6, are different from those of FIG. 1. That is, in on a silicon platform substrate in which the optical waveguide 3A and silicon substrate 1 are formed integrally, entry/exit end faces 3b to 3d are formed in the optical waveguide 3A. The photo-receiving element 6 is fixed in place opposing the end face 3b on the silicon substrate 1, by soldering or other means, and the light emitting element 5 is fixed in place on the silicon substrate 1 opposing the end face 3d, distant from the other end face, by soldering or other means. The module is designed such that an optical fiber can be connected, by means of an optical connector, to the end face 3c.

In this optical waveguide transmitter-receiver module for ATM-PON systems, the light emitting element 5 and photo-receiving element 6 operate simultaneously. Consequently, resistance to crosstalk between optical transmission and reception signals is required. For this reason, the light emitting element 5 and photo-receiving element 6 are mounted on the silicon substrate as far apart as possible, and by this means, the adverse effects of electrical crosstalk induced by electromagnetic coupling via the silicon substrate between the light emitting element 5 and photo-receiving element 6 are reduced.

Figure 3:
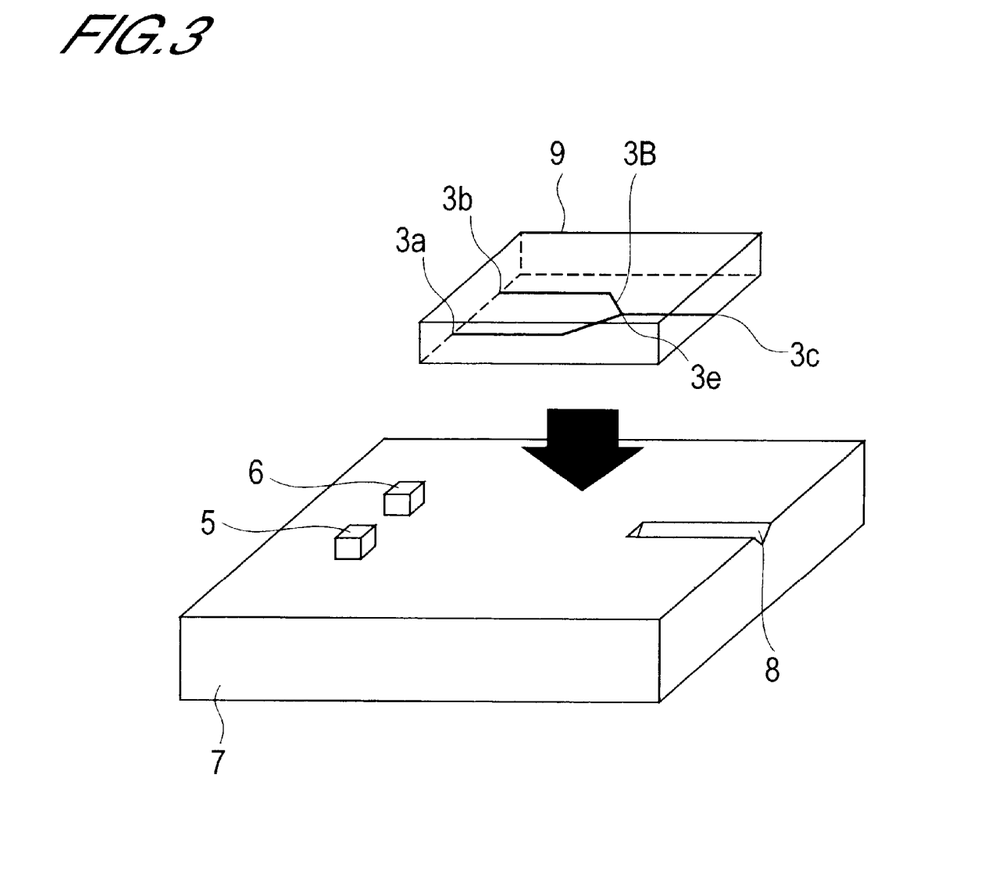
FIG. 3 is a perspective view of a conventional optical waveguide transmitter-receiver module for use in π-PON systems.

FIG. 3 is a perspective view of a conventional optical waveguide transmitter-receiver module for π-PON systems, with hybrid-integration of silicon substrate and PLC substrate respectively.

This optical waveguide transmitter-receiver module for π-PON systems has a silicon substrate 7 with flat surface; on the flat surface of this silicon substrate 7 is formed by etching a V-shaped etched groove (hereafter "V groove") 8, for aligned mounting of an optical fiber. An light emitting element 5 and photo-receiving element 6 are fixed in place on the silicon substrate by soldering or other means. A PLC substrate 9, manufactured in advance, is fixed in place by resin, soldering or other means on the silicon substrate 7, opposing the light emitting element 5, photo-receiving element 6, and V groove 8. The PLC substrate 9 is formed by layered deposition of an optical circuit, to serve as the optical waveguide 3B, on parent-material or matrix substrate, primarily silicon, quartz, or a polyimide. The optical waveguide 3B is provided with entry/exit end faces 3a to 3c opposing the light emitting element 5, photo-receiving element 6, and V groove 8.

In this optical waveguide transmitter-receiver module for π-PON systems, an optical fiber is inserted into the V groove 8, and is bonded using a resin. For example, light emitted from the light emitting element 5 is incident on the end face 3a of the optical waveguide 3B. The incident light passes through the branch part 3e, is emitted from the end face 3c, and is sent to the optical fiber in the V groove 8. On the other hand, light sent from the optical fiber is incident on the end face 3c of the optical waveguide 3B. The incident light passes through the branch part 3e, and is emitted from the end face 3b. The emitted light is received by the photo-receiving element 6, and is converted into an electrical signal and output.

However, the conventional optical waveguide transmitter-receiver modules of FIGS. 1 to 3 have the following problems (1) to (3).

(1) Case of the Optical Waveguide Transmitter-receiver Module Structure of FIG. 1 and FIG. 2

An optical waveguide transmitter-receiver module such as that of FIG. 1 and FIG. 2 adopts a silicon platform structure, in which the optical waveguide 3, 3A and silicon substrate 1 are integrated. That is, numerous optical waveguide transmitter-receiver module areas are provided on a silicon wafer, for example, and wiring patterns and other electrical circuit parts are formed in each of these areas on the silicon substrate 1; at the same time, quartz glass or other material is deposited by sputtering methods to form the optical waveguide layer 2, and thereafter a light emitting element 5 and photo-receiving element 6 are fixed in place on the silicon substrate 1 by soldering or other means. Consequently the manufacturing process is complex, and moreover each optical waveguide transmitter-receiver module area formed on the wafer must be made slightly larger in order to expedite manufacturing processes; hence such problems as limits on the quantity manufactured per unit wafer arise.

Moreover, in manufacturing processes for optical waveguide layers 2, high-temperature annealing processing must be used to execute vitrification of quartz waveguide crystals. However, if such high-temperature annealing is performed, defects occur in the silicon crystal of the silicon substrate 1, so that highly precise formation of the V groove by etching is made difficult, and consequently the realization of a receptacle structure (an optical connector structure having a function for optical fiber attachment and removal) becomes difficult. Further, when connecting an optical fiber array to the end faces 3c, 3d of the optical waveguide 3, 3A, optical core-aligned connection in order to match the optical axes is essential; and for this reason, connection tasks have required much care.

(2) Case of Optical Waveguide Transmitter-receiver Modules for ATM-PON Systems of FIG. 2

Since a light emitting element 5 and photo-receiving element 6 are operated simultaneously, superior cross-talk performance is required for the transmitting and receiving signals. Therefore, the decrease of electric cross-talk between the light emitting element 5 and the photo-receiving element 6 mounted on the silicon substrate 1 must be attained by making the dimensions of the silicon substrate larger for increasing the distance between the positions where the elements 5 and 6 are mounted, and, for this reason, the module becomes large.

(3) Case of Optical Waveguide Transmitter-receiver Modules for π-PON Systems of FIG. 3

In these optical waveguide transmitter-receiver modules for π-PON systems, the silicon substrate 7 and PLC substrate 9 are manufactured separately and independently, so that manufacturing processes can be simplified, and manufacturing quantities per unit wafer can be increased. Further, the V groove 8 is formed in integral fashion on the silicon substrate 7, so that by inserting an optical fiber into this V groove 8 and bonding with resin, the optical axes of this optical fiber and the end face 3c of the optical waveguide 3B are aligned; consequently optically non-aligned mounting of the optical fiber is possible. However, even in the case of this optical waveguide transmitter-receiver module for π-PON systems, as with (2) above, when using this model in an ATM-PON system the dimensions of the silicon substrate 7 must be made large in order to secure resistance to electrical crosstalk over the silicon substrate 7 between the light emitting element 5 and photo-receiving element 6. Further, it is structurally difficult to insert the wavelength-selection filter 4 into the PLC substrate 9, and so there is the added problem that versatility of support for STM and ATM is lacking.

SUMMARY OF THE INVENTION

One object of this invention is to provide an optical waveguide transmitter-receiver module which, by reducing electrical crosstalk, can be made smaller and can be mass-produced.

A second object of this invention is to provide an optical waveguide transmitter-receiver module which, by decreasing the bonding area with the substrate, reduces the occurrence of malfunctions.

A third object of this invention is to provide an optical waveguide transmitter-receiver module comprising a mechanism to prevent influx of the adhesive used, for improved manufacturing yields.

In order to resolve the above problems, this invention comprises the configurations described below. This invention concerns a planar-mounted optical waveguide transmitter-receiver module, hybrid-integrated onto a plurality of separated substrates. This module comprises a first silicon or other substrate, in the flat surface of which a first groove to accommodate protrusions is formed, and in the flat surface of which a first mark for position alignment is formed; a second silicon or other substrate, having the same thickness as this first substrate, in the flat surface of which is formed a second groove to accommodate a protruding part and a third groove to accommodate an optical fiber, and in the flat surface of which a second mark for position alignment is formed; a semiconductor laser or other light emitting element, fixed in place with position aligned with the surface of either the first or the second substrate; a photodiode or other optical photo-receiving element; and a PCL substrate or other third substrate.

In the case of a configuration in which the photo-receiving element is used in modes in which is operates simultaneously with the light emitting element, the photo-receiving element is fixed in place, with position aligned, on the surface of either the second or the first substrate, whichever is not the substrate on which the light emitting element is fixed in place. Further, when employing a configuration used in modes in which the photo-receiving element and the light emitting element operate at different times, the photo-receiving element is fixed in place, with position aligned, on the first or the second substrate, either the same substrate on which the light emitting element is fixed, or the other substrate. In the third substrate is formed a protrusion, of the thickness of the optical waveguide, electrodes and other components, in a position to oppose the first and second grooves and with back surface opposing the first and second substrates. In the third substrate are also formed, at positions on side faces thereof and opposing the emitting part of the light emitting element and the receiving part of the photo-receiving element respectively, an entry end face and exit end face for the optical waveguide. Further, parts of the back surface of this third substrate are fixed or bonded to parts of the surfaces of the first and second substrates, with positions aligned using the first and second marks as references.

By adopting such a configuration, in the case of an optical waveguide transmitter-receiver module for ATM-PON systems in which the light emitting element and photo-receiving element operate simultaneously, the light emitting element and photo-receiving element are fixed in place, by soldering or other means, to different substrates, so that electrical crosstalk via substrate between the light emitting element and photo-receiving element is simply and appropriately reduced.

In the case of an optical waveguide transmitter-receiver module for STM-PON systems or for π-PON systems in which the light emitting element and photo-receiving element operate at different times, the problem of electrical crosstalk does not often occur, and so the light emitting element and photo-receiving element are fixed in place, by soldering or other means, on the same substrate or on different substrates.

By means of a module of this invention, in the case of specifications in which both a light emitting element and a photo-receiving element operate simultaneously, by separating the substrate on which the light emitting element is mounted and the substrate on which the photo-receiving element is mounted, electrical crosstalk between the light emitting element and the photo-receiving element can be simply and appropriately reduced. By this means, the dimensions of substrates on which light emitting element and photo-receiving elements are mounted can be decreased, and the number of units manufactured from a wafer or similar can be increased. Further, in this configuration parts of a first and second substrate are fixed to parts of a third substrate, so that the adhesive areas between substrates can be decreased; consequently warping of each substrate, strain arising from differences in linear expansion coefficients, stress concentration, and degradation of bonding strength can be reduced.

In a preferred embodiment of this invention, dicing is used to form dicing grooves in the first and second groove sides, opposing the end of the third groove, the emitting part of the light emitting element and receiving part of the photo-receiving element respectively. By this means, when for example using adhesive to bond the first, second, and third substrates, excess adhesive resin flows into the dicing grooves, and so prevents flowing toward the light emitting element and photo-receiving element.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

First Embodiment

Figure 4:
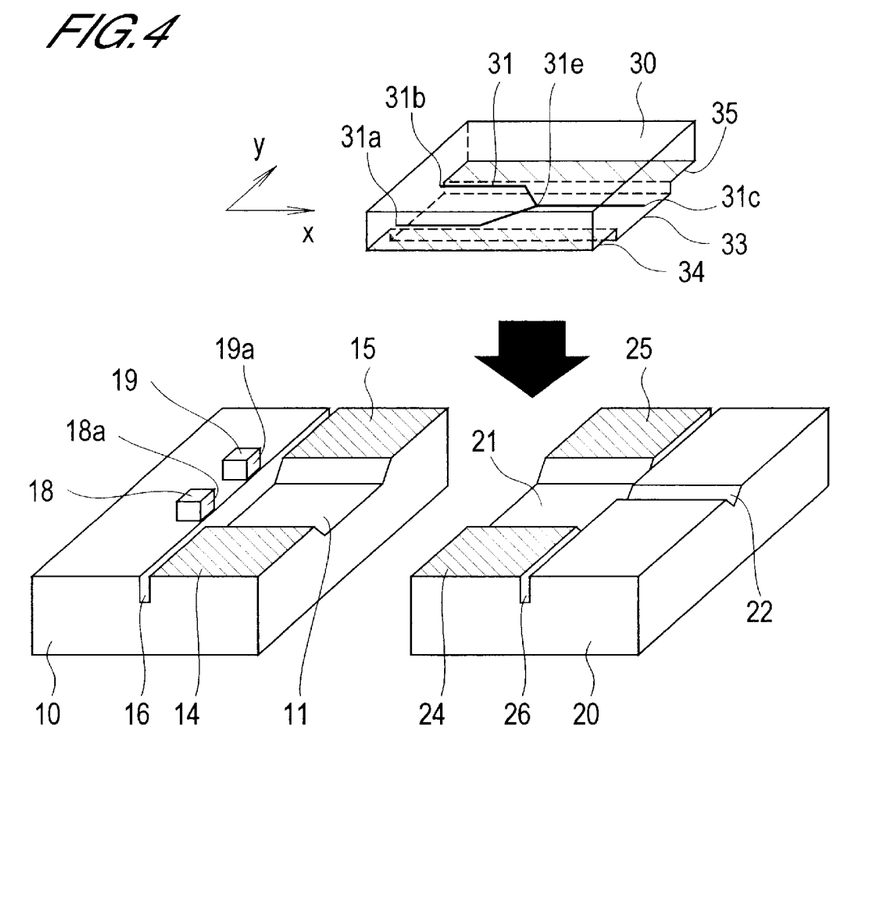
FIG. 4 is a perspective, exploded view of the optical waveguide transmitter-receiver module of a first embodiment of this invention, applied to a π-PON system.

FIG. 4 is a perspective, exploded view of the optical waveguide transmitter-receiver module of a first embodiment of this invention, applicable to a π-PON system.

In this optical waveguide transmitter-receiver module, a strip or rectangle solid-shaped first substrate (for example, a silicon substrate) 10, on which are mounted optical elements; a strip or rectangle solid-shaped second substrate (for example, a silicon substrate) 20 having the same thickness as the silicon substrate 10, and for connection of optical fibers; and a strip or rectangle solid-shaped third substrate (for example, a PLC substrate) 30, on which is formed an optical waveguide, are separated. These three substrates 10, 20, 30 are hybrid-integrated in a planar-mounted structure.

One of the principal surfaces of the silicon substrate 10, which is the upper face (hereafter simply "surface"), is flat, and in this surface, the first groove is formed (for example, an etched groove 11 is formed by etching). This first groove 11 is formed with a constant width, from one side face of the first silicon substrate 10 to the other side face. Further, this first groove 11 is formed with a constant depth, in the depth direction, from the flat surface of the silicon substrate 10. The etched groove 11 is to accommodate the protruding part 33 on the back-face side of the PCL substrate 30, that is, the face on the side opposing the first and second substrates 10, 20. The flat areas of the silicon substrate surface in the vicinity of the etched groove 11, remaining after the etched groove 11 is formed, become the joining surfaces 14, 15 for fixing the PLC substrate 30. In this configuration example, the joining surfaces 14, 15 are formed on either side of and enclosing the etched groove 11. A first dicing groove 16, adjoining and linked with the etched groove 11, is formed by dicing. A wiring or interconnection pattern is formed in the surface area of the silicon substrate 10 outside the grooves, adjoining the dicing groove 16. Onto this wiring pattern, a semiconductor laser or other light emitting element 18, and a photodiode or other photo-receiving element 19, are connected by soldering or other means. When an electrical signal is applied to the light emitting element 18, light is emitted from the active layer or other emitting part 18a. When light from outside is received by the receiving part 19a of the photo-receiving element 19, this light is converted into an electrical signal and output.

The second substrate positioned opposing the silicon substrate 10, namely, the silicon substrate 20, has a smooth upper principal surface (hereafter simply "surface"). Second and third grooves are formed (for example, etching is used to form an etched groove 21 and V groove 22) in the flat surface of this second substrate 20. This second groove 21 is, like the first groove, formed in the second substrate 20 from one side face on the side of the second silicon substrate 20 opposing the first substrate 10. The second groove 21, which is an etched groove, is a groove which accommodates the protruding part 33 on the above-described back-face side of the PCL substrate 30. The flat areas of the silicon substrate surface in the vicinity of the etched groove 21, remaining after the etched groove 21 is formed, become the joining surfaces 24, 25. The joining surfaces 24, 25 are surface areas for fixing in place the PLC substrate 30. The third groove 22, which is a V groove, is a groove used for aligned mounting of an optical fiber; by inserting an optical fiber into this groove and fixing in place using resin or other material, the optical fiber is fixed in place with optical axis aligned. Between the etched groove 21 and V groove 22 of the second silicon substrate 20, dicing is used to form a second dicing groove 26.

The PLC substrate 30 fixed on top of the silicon substrates 10, 20 has a layered structure in which a substrate of, for example, silicon, quartz, polyimide, or some other parent material, and an optical circuit to serve as the optical waveguide 31 on the parent-material or matrix substrate, are layered. The optical waveguide 31 has a dual-branching structure. This optical waveguide 31 has a structure in which a core for optical transmission is formed at its center, and surrounding this a cladding layer to envelop light is formed. The entry/exit end faces 31$a$ to 31$c$ of this optical waveguide 31 are formed on the side surfaces of the PLC substrate 30, and the end faces 31$a$, 31$b$ are coupled to the end face 31$c$ by the branching part 31$e$. The protruding part 33 of the cladding layer on the periphery of the optical waveguide core is formed protruding on the back-face side of the PLC substrate 30. Flat places on the back surface of the PLC substrate in the vicinity of this protruding part 33 serve as joining surfaces 34, 35. In this configuration example, these joining surfaces 34, 35 are formed on both sides of the protruding part. The joining surfaces 34, 35 are used for fixing to the joining surfaces 14, 15, 24, 25 of the first and second silicon substrates 10, 20. This PLC substrate 30 is set such that the height from the joining surfaces 34, 35 to the optical waveguide core is the same as the height of the emitting part 18$a$ of the light emitting element 18, the receiving part 19$a$ of the photo-receiving element 19, and the optical fiber core.

Such an optical waveguide transmission/receiving module may, for example, be manufactured as follows.

In the wafer state, numerous chips for silicon substrate 10, chips for silicon substrate 20, and chips for PLC substrate 30 are each formed, and dicing used to separate each of the chips. The silicon substrate 10 and silicon substrate 20 are positioned opposing each other at a prescribed interval. That is, both the substrates 10 and 20 are provided in an arrangement with one side of each mutually opposed. On the joining surfaces 14, 15, 24, 25 of the surfaces of the silicon substrates 10, 20, the protruding surfaces 34, 35 of the back surface of the PLC substrate 30 are placed, and these joining surfaces 14, 15, 24, 25 and joining surfaces 34, 35 are bonded together with resin, solder, or by similar means, to fix the PLC substrate 30 in place on the silicon substrates 10, 20. Position adjustment in the X-Y directions is performed by alignment referring to the images of metal or V groove marks formed with high precision on each of the silicon substrates 10, 20. By this means, the emitting part 18$a$ of the light emitting element 18 and the end face 31$a$ of the optical waveguide 31 are opposed, the receiving part 19$a$ of the photo-receiving element 19 and the end face 31$b$ of the optical waveguide 31 are opposed, the end part of the V groove 22 and the end face 31$c$ of the optical waveguide 31 are opposed, and the substrates are fixed in place with these optical axes aligned.

An optical fiber is inserted, and fixed in place with resin or by other means, in the V groove 22 of an optical waveguide transmitter-receiver module manufactured in this way. When the light emitting element 18 and receiver element 19 are operated, light emitted from the emitting part 18$a$ of the light emitting element 18 is incident on the end face 31$a$ of the optical waveguide 31. Light which has been incident passes through the branch part 31$e$ of the optical waveguide 31, is emitted from the end face 31$c$, and is sent to the optical fiber in the V groove 22. On the other hand, light sent from the optical fiber is incident on the end face 31$c$ of the optical waveguide 31. Light which has been incident passes through the branch part 31$e$ of the optical waveguide 31, and is emitted from the end face 31$b$. The emitted light is received at the receiving part 19$a$ of the photo-receiving element 19, is converted into an electrical signal and output. In this way, through simultaneous optical coupling of the optical waveguide 31 and the light emitting element 18, photo-receiving element 19 and optical fiber, transmitter-receiver module functions can be obtained.

This first embodiment has the following advantageous results (a) and (b).

(a) The silicon substrates 10, 20 and the PLC substrate 30 are manufactured separately and independently, so that manufacturing processes can be simplified, and the quantities manufactured per unit wafer can be increased. Further, a V groove 22 is formed in the silicon substrate 20; by inserting an optical fiber into this V groove 22 and fixing it in place with resin or by other means, non-aligned mounting of the optical fiber can be realized.

(b) The silicon substrates 10, 20 and PLC substrate 30 are fixed in place by means of these small-area joining surfaces 14, 15, 24, 25, 34, 35, so that the bonding area can be reduced. As a result, warping of each of the substrates 10, 20, 30, strain arising from differences in linear expansion coefficients, stress concentration, and degradation of bonding strength can be reduced.

Second Embodiment

Figure 5:
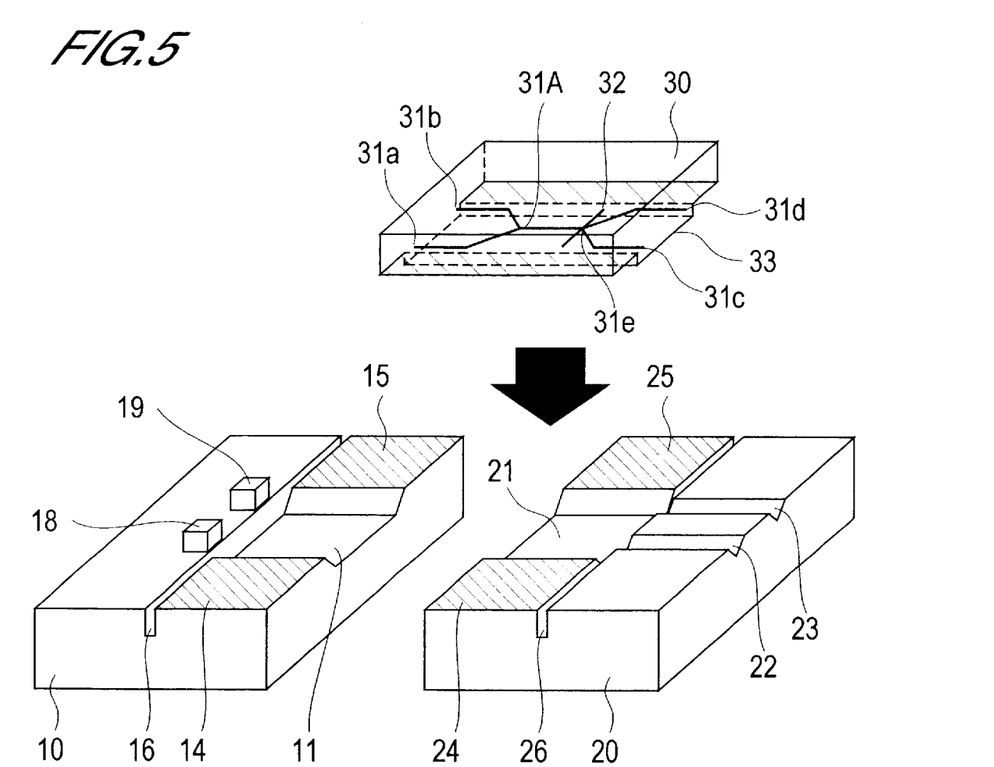
FIG. 5 is a perspective, exploded view of the optical waveguide transmitter-receiver module of a second embodiment of this invention, as an example of application to an STM-PON system.

FIG. 5 is a perspective, exploded view of the optical waveguide transmitter-receiver module of a second embodiment of this invention, as an example of application to an STM-PON system. Components which are common with components in FIG. 4, showing the first embodiment, are assigned common symbols.

In the optical waveguide transmitter-receiver module of the second embodiment, in addition to the V groove 22, another V groove 23 is simultaneously formed by etching in the silicon substrate 20 of FIG. 4. In this configuration example, the V grooves 22 and 23 are formed in parallel; but this does not limit the scope of this invention. The optical waveguide 31A formed in the PLC substrate 30 has entry/exit end faces 31$a$ to 31$d$; a groove is cut, for example by dicing, in the branching part 31$e$ joining the end faces, and a wavelength-selecting filter 32 is embedded. Otherwise the configuration is similar to that of FIG. 4.

In the method of manufacture of this optical waveguide transmitter-receiver module, the chip for the silicon substrate 10, the chip for the silicon substrate 20, and the chip for the PLC substrate 30 are manufactured in advance. The joining surfaces 34, 35 of the PLC substrate 30 are placed on top of the joining surfaces 14, 15, 24, 25 of the silicon substrates 10, 20, and these joining surfaces 14, 15, 24, 25, 34, 35 are bonded with resin, solder, or by other means.

In such an optical waveguide transmitter-receiver module, optical fibers are inserted into each of the V grooves 22, 23, and fixed in place with resin or by other means. When the light emitting element 18 and photo-receiving element 19 are operated, for example, light emitted from the emitting part 18a of the light emitting element 18 is incident on the end face 31a of the optical waveguide 31A. The incident light is wavelength-selected by a filter 32 for wavelength selection, provided at the branch part 31e of the optical waveguide 31A, and is emitted from, for example, the end face 31c. The emitted light is sent to the optical fiber inserted in the V groove 22. On the other hand, light sent from the optical fiber in the V groove 22 is incident on the end face 31c of the optical waveguide 31A. The incident light is wavelength-selected by the filter 32 for wavelength selection, and is, for example, emitted from the end face 31b. The emitted light is received by the receiving part 19a of the photo-receiving element 19, is converted into an electrical signal and output. Light of a different wavelength sent from the optical fiber in the V groove 22 is incident on the end face 31c of the optical waveguide 31A. The incident light is wavelength-selected by the filter 32 for wavelength selection, and emitted from the end face 31d. The emitted light is sent to the optical fiber inserted into the V groove 23.

In this way, a filter 32 for wavelength selection is inserted into the branch part 31e of the optical waveguide 31A, and so the module of the second embodiment is capable of bidirectional communications using two-wavelength signals.

In the module of this second embodiment, advantageous results similar to the results (a), (b) of the first embodiment are obtained, and in addition the following result is obtained. Namely, in this module each of the substrates 10, 20, 30 is separated, so that insertion of the filter 32 for wavelength selection into the PLC substrate 30 is made easy.

Third Embodiment

Figure 6:
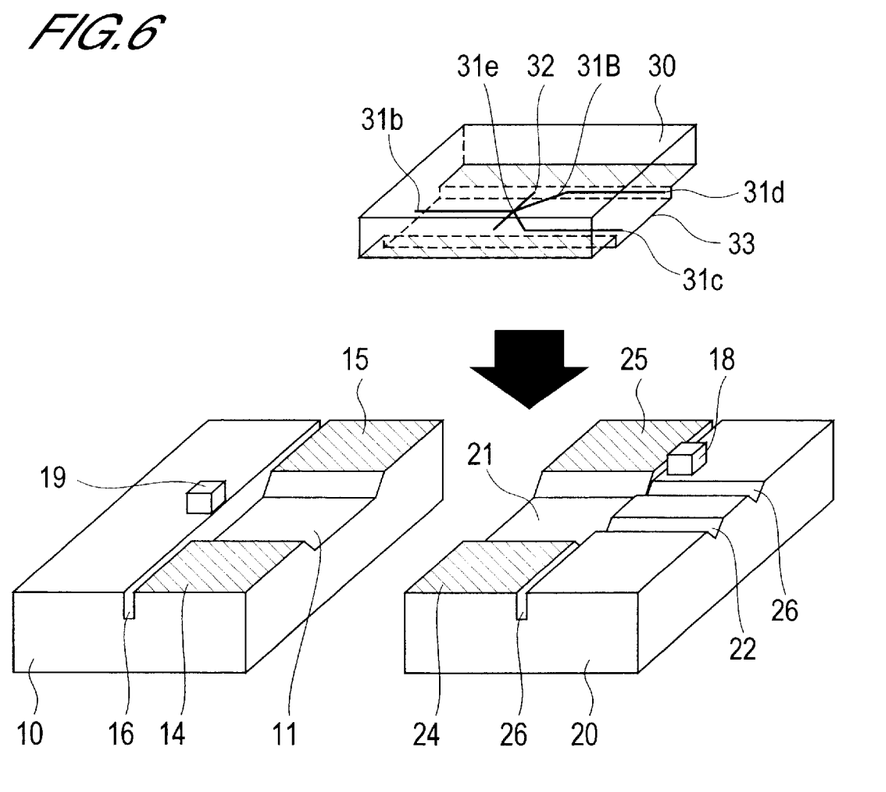
FIG. 6 is a perspective, exploded view of the optical waveguide transmitter-receiver module of a third embodiment of this invention, as an example of application to an ATM-PON system.

FIG. 6 is a perspective, exploded view of the optical waveguide transmitter-receiver module of a third embodiment of this invention, as an example of application to an ATM-PON system. Components which are common with components in FIG. 4 and FIG. 5, showing the first and second embodiments, are assigned common symbols.

For example, in the optical waveguide transmitter-receiver module used in an ATM-PON system, the light emitting element 18 and photo-receiving element 19 operate simultaneously, and electrical crosstalk occurs via the silicon substrate between these elements, exerting adverse effects. Hence of the two separate first and second silicon substrates 10, 20, the photo-receiving element 19 is fixed in place by soldering or other means to the surface of the silicon substrate 10, and the light emitting element 18 is fixed in place by soldering or other means to the surface of the other silicon substrate 20.

Simultaneously with formation of the V groove 22 for optical fiber insertion, an etched groove 26 is formed in the vicinity of the V groove 22 on the surface of the second silicon substrate 20. This groove 26 prevents, for example, the influx toward the light emitting element 18 of bonding resin when fixing the optical fiber in place in the V groove 22. An optical waveguide 31B is formed in the PLC substrate 30 which is connected on top of the silicon substrates 10, 20. The optical waveguide 31B has entry/exit end faces 31b to 31d, and at the branch part 31e which couples these, a groove is cut by dicing, for example, and a wavelength-selection filter 32 is embedded.

In the method of manufacture of this optical waveguide transmitter-receiver module, similarly to the first or the second embodiments, the chip for the silicon substrate 10, the chip for the silicon substrate 20, and the chip for the PLC substrate 30 are manufactured in advance. The joining surfaces 34, 35 of the PLC substrate 30 are placed on top of the joining surfaces 14, 15, 24, 25 of the silicon substrates 10, 20, and these joining surfaces 14, 15, 24, 25, 34, 35 are bonded with resin, solder, or by other means.

In an optical waveguide transmitter-receiver module manufactured in this way, light emitted from, for example, a light emitting element 18 is incident on the end face 31d of the optical waveguide 31B. The incident light is wavelength-selected by the filter 32 for wavelength selection of the optical waveguide 31B, and is emitted from the end face 31c. The emitted light is sent to the optical fiber inserted in the V groove 22. On the other hand, light which is incident from the optical fiber inserted in the V groove 22 is incident on the end face 31c of the optical waveguide 31B. The incident light is wavelength-selected by the filter 32 for wavelength selection, and is emitted from the end face 31b. The emitted light is received by the photo-receiving element 19, and converted into an electrical signal.

In this way, by inserting a filter 32 for wavelength selection at the branch part 31e of the optical waveguide 31B, similarly to the module of FIG. 5, the module of this third embodiment is capable of bidirectional communication using two-wavelength signals.

In addition to obtaining the advantageous results of the modules of the first and second embodiments, the module of this third embodiment also affords the advantageous results (c) through (e) below.

(c) The silicon substrate 20 on which the light emitting element 18 is mounted and the silicon substrate 10 on which the photo-receiving element is mounted are separated, so that electrical crosstalk via silicon substrate between the light emitting element 18 and photo-receiving element 19 can be greatly reduced. Moreover, there is no need to increase the gap between the light emitting element 18 and photo-receiving element 19 in order to reduce electrical crosstalk, as in conventional designs, so that the silicon substrates 10 and 20 can be reduced in size and placed in proximity. Hence the reduction in silicon substrate dimensions enables increases in quantities manufactured from a wafer.

(d) An optical waveguide transmitter-receiver module like that of this embodiment is, for example, fixed in place to a package or other mounting frame. When fixing the silicon substrates 10, 20 to a package or other mounting frame, resin, solder, or some other means of bonding is used. In particular, if either an insulating sheet is provided between substrates and mounting frame, or insulating resin is used as the adhesive, electrical crosstalk occurring via the mounting frame between the light emitting element 18 and photo-receiving element 19 can be further reduced. In order not to detract from the effect of heat dissipation from the silicon substrate 20, which is also a heat sink (heat-dissipating member) for the light emitting element 18, silver paste or some other highly heat-conducting resin may be used as the adhesive between the mounting frame and the silicon substrate 20 on which the light emitting element 18 is mounted.

(e) As an advantageous effect included in the modules of the first through third embodiments, by selecting a combination of the silicon substrates 10, 20 and PLC substrate 30 which are the principal components, versatility in application to STM-PON systems, π-PON systems, ATM-PON systems, and other systems is greatly enhanced, and a greater number of optical module manufacturing processes can be performed in common.

Fourth Embodiment

Figure 7:
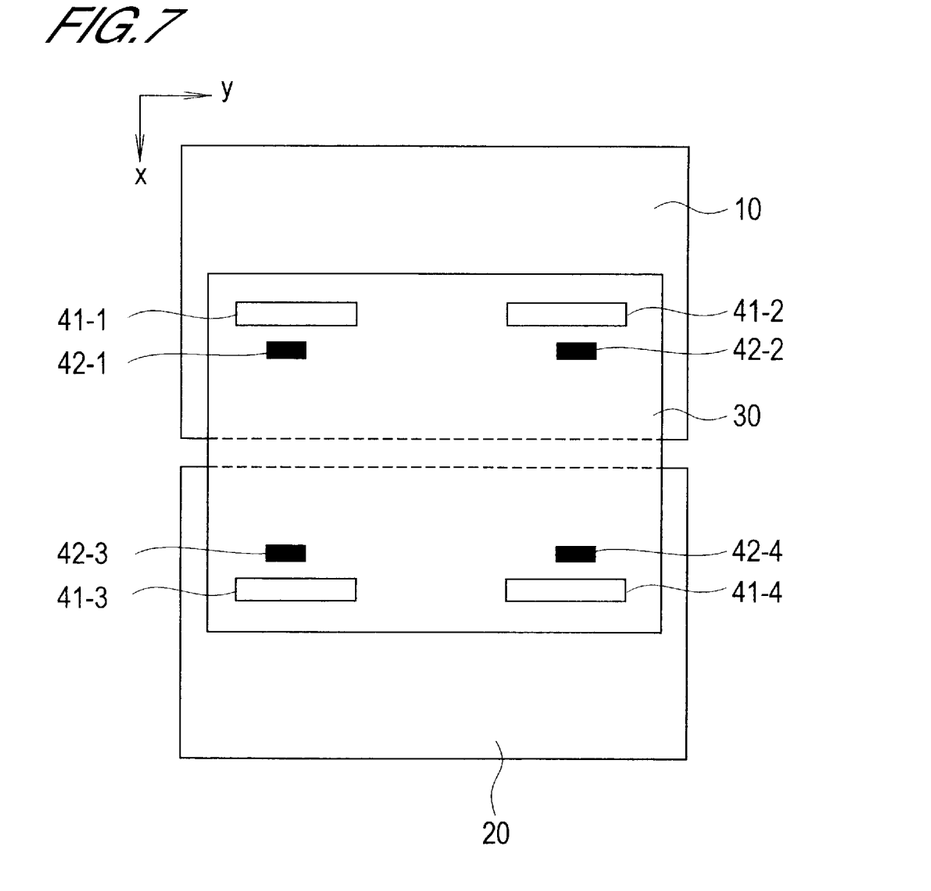
FIG. 7 is a diagram explaining a method of position alignment of silicon substrates and PLC substrate, showing a fourth embodiment of this invention.

FIG. 7 is a diagram explaining a method of position alignment of silicon substrates and PLC substrate, showing a fourth embodiment of this invention.

FIG. 7 shows position alignment marks within joining x-y surfaces of the first and second silicon substrates 10, 20 and the PLC substrate 30, which is the third substrate, used in the manufacture of, for example, the optical waveguide transmitter-receiver module of FIG. 4, showing the first embodiment of this invention.

For example, first positioning marks 41-1, 41-2 are formed on the joining surfaces 14, 15 of the silicon substrate 10; and second positioning marks 41-3, 41-4 are formed on the joining surfaces 24, 25 of the silicon substrate 20. Metal, etched grooves, oxide films, or similar are used to form these marks 41-1 through 41-4. On the joining surfaces 34, 35 on the back face of the PLC substrate 30 also, third positioning marks 42-1 through 42-4 are formed, corresponding to the positioning marks 41-1 through 41-4. Metal, quartz, or similar are used to form these third positioning marks 42-1 through 42-4.

For mark image recognition, application of mark edge recognition methods using a white-light epi-illumination image, a red-light transmissive image or a reflected image, or of area-weighted methods is conceivable. Marks 41-1 through 41-4, 42-1 through 42-4 in four corners, or in two opposing corners in strip shape, of the substrates 10, 20, 30 are formed with high precision, and image recognition is used to perform three-axis adjustment of the angles and optical axes of the joining-surface directions, or of directions parallel to optical axes.

This fourth embodiment has the following advantageous results.

By simultaneously creating marks 41-1 to 41-4 and so on on the silicon substrates 10, 20 for positioning the light emitting element 18, photo-receiving element 19, optical fiber, and PLC substrate 30, mounting of each of these optical components with high-precision positioning is possible.

Fifth Embodiment

Figure 8:
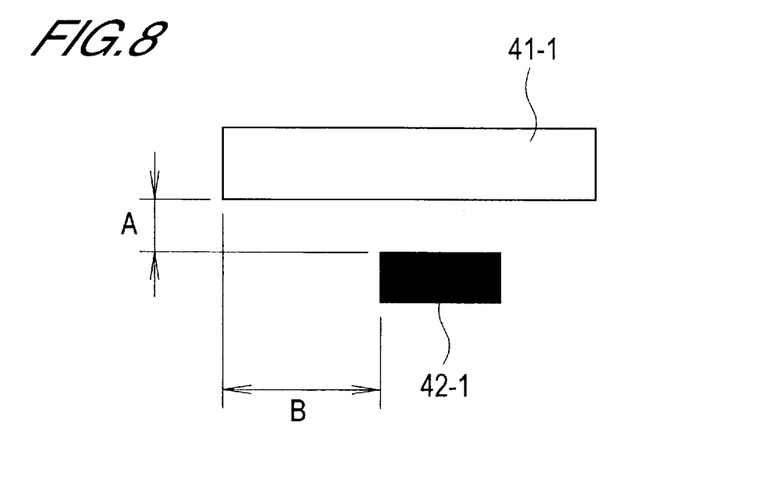
FIG. 8 is a diagram explaining a method of position alignment, showing a fifth embodiment of this invention.

FIG. 8 is a diagram explaining a method of position alignment, showing a fifth embodiment of this invention, which is an example of application of a mark edge recognition method. In this FIG. 8, the mark 41-1 on the silicon substrate 10, and part of the mark 42-1 on the PLC substrate 30, are shown.

In this positioning method, by adjusting the distances A, B between edges of the marks 41-1, 42-1, and similarly for the marks 41-1, 42-1, . . . of all four corners or of two corners, three-axis adjustment similar to that of the fourth embodiment is possible, and an advantageous result similar to that of the fourth embodiment is obtained.

Sixth Embodiment

Figure 9:
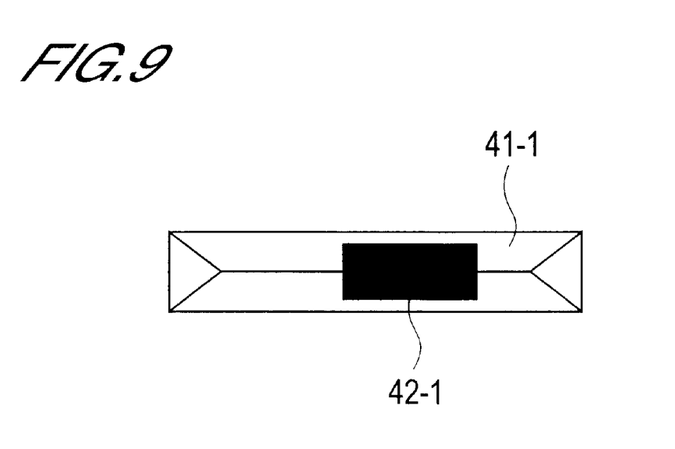
FIG. 9 is a diagram explaining a method of position alignment, showing a sixth embodiment of this invention; and, FIG. 10 is a diagram explaining a method of position alignment, showing a seventh embodiment of this invention.

FIG. 9 is a diagram explaining a method of position alignment, showing a sixth embodiment of this invention, which is an example of application of a mark edge recognition method.

In FIG. 9, an example is shown in which etched grooves are used as the marks 41-1, . . . on the silicon substrates 10, 20. In order to absorb the thickness of the mark or marks 42-1 formed on the PLC substrate 30 (for example, the thickness of a metal mark, or the swelling of quartz due to a mark), a construction is adopted in which the mark 42-1 of the PLC substrate 30 is superposed on the etched groove side of the marks 41-1, . . . of the silicon substrates 10, 20.

This sixth embodiment has the following advantageous result.

The mark 42-1 on the PLC substrate 30 is superposed on the V groove mark or marks 41-1 formed in the silicon substrates 10, 20, so that the thickness of the mark 42-1 on the PLC substrate 30 is absorbed. Consequently the mounting precision of the joining surfaces of the silicon substrates 10, and the PLC substrate 30 is not degraded, and no positional deviations occur in the heights of the optical axes of each of the optical components.

Seventh Embodiment

Figure 10:
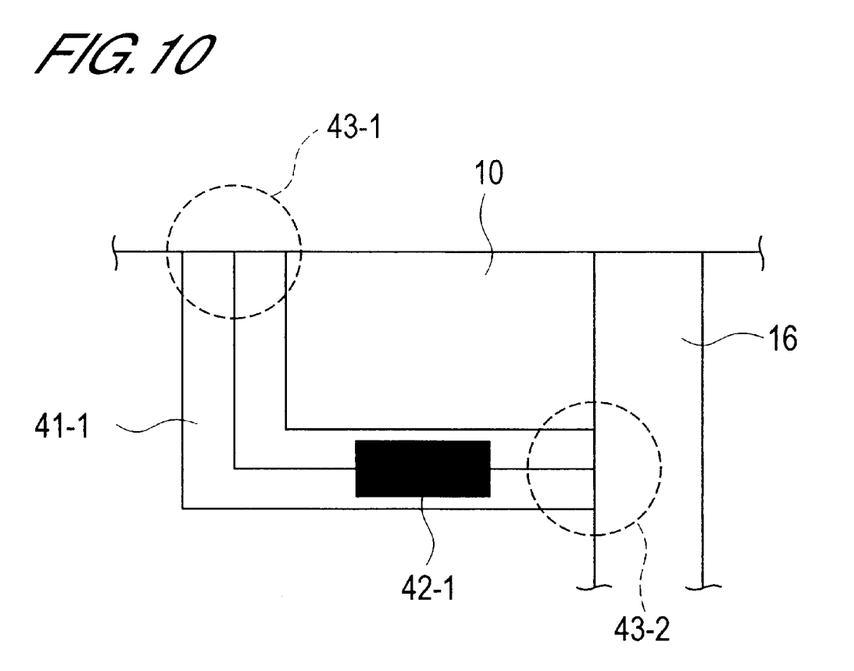

FIG. 10 is a diagram explaining a method of position alignment, showing a seventh embodiment of this invention, which is an example of application of a mark edge recognition method.

In FIG. 10, similarly to FIG. 9, an example is shown of the use of etched grooves, for example V grooves in an L shape, as the marks 41-1, . . . on the silicon substrates 10, 20. An aperture part 43-1 is formed in the end part of the etched groove of the mark 41-1, and an aperture part 43-2 is also formed in the end part of the dicing groove 16. The aperture part 43-1 is provided as an entrance for influx of adhesive resin applied from the side faces of the silicon substrates 10, 20. The aperture part 43-2 is an aperture to exude adhesive resin, and to prevent voids from remaining in the etched groove upon influx of the adhesive resin.

This seventh embodiment has the following advantageous result.

Because the aperture parts 43-1, 43-2 are provided as apertures for influx and exuding of adhesive resin in the V groove mark 41-1 of the silicon substrates 10, 20, the functions of a mark for position adjustment and of a means for the smooth influx of adhesive resin can be combined.

Examples of Variations of Embodiments

This invention is not limited to the above embodiments, and other variations and embodiments are possible. Such variations or embodiments may, for example, include the following (1) and (2).

(1) In the first through third embodiments, examples of application to optical waveguide transmitter-receiver modules used in STM-PON systems, π-PON systems, ATM-PON systems, and other systems were described; but by application to optical multiplexer/demultiplexer arrays employing optical waveguides, and to connection of multi-core waveguides and optical fibers, advantageous results similar to those of the above embodiments can be anticipated.

(2) By combining a plurality of silicon substrates 10, 20, . . . and PLC substrates 30, . . . , optical circuit configurations more complex than those of the above embodiments are possible. This method is not limited to silicon substrates 10, 20, . . . and PLC substrates 30, . . . , but can also be applied to join substrates of the same type, or to join flat substrates using other types of materials.

What is claimed is:

1. An optical waveguide transmitter-receiver module, comprising:

a first substrate, in the flat surface of which is formed a first groove to accommodate a protrusion, and in the flat surface of which a first positioning mark is formed;

a second substrate, having thickness equal to the thickness of said first substrate, in the flat surface of which are formed a second groove to accommodate a protrusion and a third groove to accommodate an optical fiber, and in the flat surface of which a second positioning mark is formed;

a light emitting element, positioned and fixed in place on the surface of either said first substrate or said second substrate;

a photo-receiving element which, when the module specifications call for operation simultaneously with said light emitting element, is positioned and fixed in place on the surface of either said first substrate or said second substrate, differing from the substrate on which the light emitting element is fixed in place, and which, when the module specifications call for operation at times differing from the times of operation of said light emitting element, is positioned and fixed in place on either of said substrates; and, a third substrate, wherein a protruding part is formed on the back surface thereof, at a position facing said first and second grooves, entry end faces and exit end faces of an optical waveguide are formed at positions in the side faces thereof facing the end part of said third groove, the emitting part of said light emitting element, and the receiving part of said photo-receiving element, and part of said back surface thereof is fixed in place on parts of the surfaces of said first and second substrates, being positioned with reference to said first and second marks.

2. An optical waveguide transmitter-receiver module according to claim 1, comprising a dicing groove, formed by dicing, on the sides of said first and second grooves, facing said third groove end and facing the emitting part of said light emitting element and the receiving part of said photo-receiving element, respectively.

3. An optical waveguide transmitter-receiver module according to claim 1, wherein said third substrate comprises a parent-material substrate and an optical waveguide layer formed on the parent-material substrate.

4. An optical waveguide transmitter-receiver module according to claim 3, wherein said optical waveguide layer comprises a core layer for optical transmission at the center and a cladding layer on the periphery of the core layer, with the cladding layer forming said protruding part.

5. An optical waveguide transmitter-receiver module according to claim 1, wherein said optical waveguide has a dual-branch structure.

6. An optical waveguide transmitter-receiver module according to claim 1, wherein said first and second substrates are positioned at a fixed mutual distance, such that said first and second grooves cooperate to form a single groove for accommodation of said protruding part.

7. An optical waveguide transmitter-receiver module according to claim 1, wherein said first and second substrates are rectangle solid bodies of the same thickness;

said first and second substrate are positioned with one side face of each in mutual opposition and at a distance;

said first groove is formed with a fixed width from said side face toward the other side face of said first substrate, and with a fixed depth in the depth direction from the flat surface of said first substrate;

said second groove is formed with a fixed width from said side face toward the other side face of said second substrate, and with a fixed depth in the depth direction from the flat surface of said second substrate;

said first substrate has a first dicing groove, linked with said first groove, formed linearly and in the direction parallel to said side face; and, said second substrate has a second dicing groove, linked with said second groove, formed linearly and in the direction parallel to said side face.

8. An optical waveguide transmitter-receiver module according to claim 7, wherein said first and second substrates support, in flat surface areas on both sides of said first and second grooves, the back-face areas of said third substrate other than said protruding part, and said protruding part is accommodated within said first and second grooves.

9. An optical waveguide transmitter-receiver module according to claim 1, wherein two of said third grooves are provided.

10. An optical waveguide transmitter-receiver module according to claim 9, wherein said optical waveguide has a dual-branch structure comprising, at the branch part, a filter for wavelength selection.

11. An optical waveguide transmitter-receiver module according to claim 1, wherein said first and second positioning marks are formed in the joining surfaces on both sides of said first and second grooves, and third positioning marks are formed in the joining surfaces on both sides of the protruding part of said third substrate, to be aligned with said first and second positioning marks.

12. An optical waveguide transmitter-receiver module according to claim 1, wherein said first and second positioning marks are formed from either metal, or etching grooves, or oxide film, or similar, and said third positioning marks are formed from metal or quartz.

13. An optical waveguide transmitter-receiver module according to claim 7, wherein said first positioning mark is an L-shape first V groove, provided near the intersection of an end face of said first substrate and said first dicing groove, and opening at the end face and at the first dicing groove; and, said second positioning mark is an L-shape second V groove, provided near the intersection of an end face of said second substrate and said second dicing groove, and opening at the end face and at the second dicing groove.

* * * * *